United States Patent [19]
Winter et al.

[11] Patent Number: 5,768,482
[45] Date of Patent: Jun. 16, 1998

[54] RESOLUTION-TRIGGERED SHARPENING FOR SCALING OF A DIGITAL-MATRIX IMAGE

[75] Inventors: Kirt Alan Winter; Frank Anthony Kurucz, both of Escondido, Calif.

[73] Assignee: Hewlett-Packard Company, Palo Alto, Calif.

[21] Appl. No.: 490,289

[22] Filed: Jun. 14, 1995

[51] Int. Cl.$^6$ .................................................. G06K 15/00
[52] U.S. Cl. .................. 395/109; 358/456; 358/518; 358/504; 382/274; 382/299
[58] Field of Search .................................. 395/109, 106, 395/102, 101, 114; 358/455–457, 447–502, 504, 530, 534, 518; 382/274, 275, 299, 252

[56] References Cited

U.S. PATENT DOCUMENTS

| | | | |
|---|---|---|---|
| 4,633,327 | 12/1986 | Roetling | 382/274 |
| 5,187,594 | 2/1993 | Deutsch et al. | 358/455 |
| 5,226,094 | 7/1993 | Eschbach | 358/456 |
| 5,274,471 | 12/1993 | Kim | 358/455 |
| 5,282,057 | 1/1994 | Mailloux et al. | 358/445 |
| 5,313,309 | 5/1994 | Tai et al. | 358/455 |
| 5,363,209 | 11/1994 | Eschbach et al. | 358/518 |
| 5,363,213 | 11/1994 | Coward et al. | 358/455 |
| 5,515,480 | 5/1996 | Frazier | 395/109 |

*Primary Examiner*—Dwayne Bost
*Assistant Examiner*—Tracy M. Legree

[57] ABSTRACT

Method and apparatus prepare an image for printing—and in some cases include an output stage, performing the actual printing—when the overall number of pixels is being scaled up or down from an original image or portion. Image-sharpening procedures are controlled automatically by a function of the number of pixels in the original image and the number in the output device. Any of a great variety of such functions may be used, but we prefer a step-function of a ratio of the two pixel counts—particularly a two-valued step-function in which one value is zero and the other serves as a sharpening factor in a sharpening algorithm. When the function yields its zero value, for efficiency the sharpening computations are preferably turned off. The nonzero value is automatically selected when the number of output pixels is more than twice the number of input pixels. The sharpening-factor value, ideally two, is multiplied by the deviation of each image element, e. g. pixel, from the average of its adjacent neighbors; this product is added to the level of the subject image element to form an adjusted level. Weighting or selection of neighbor values along particular axes allows for anisotropic resolution or anamorphic scaling.

22 Claims, 9 Drawing Sheets

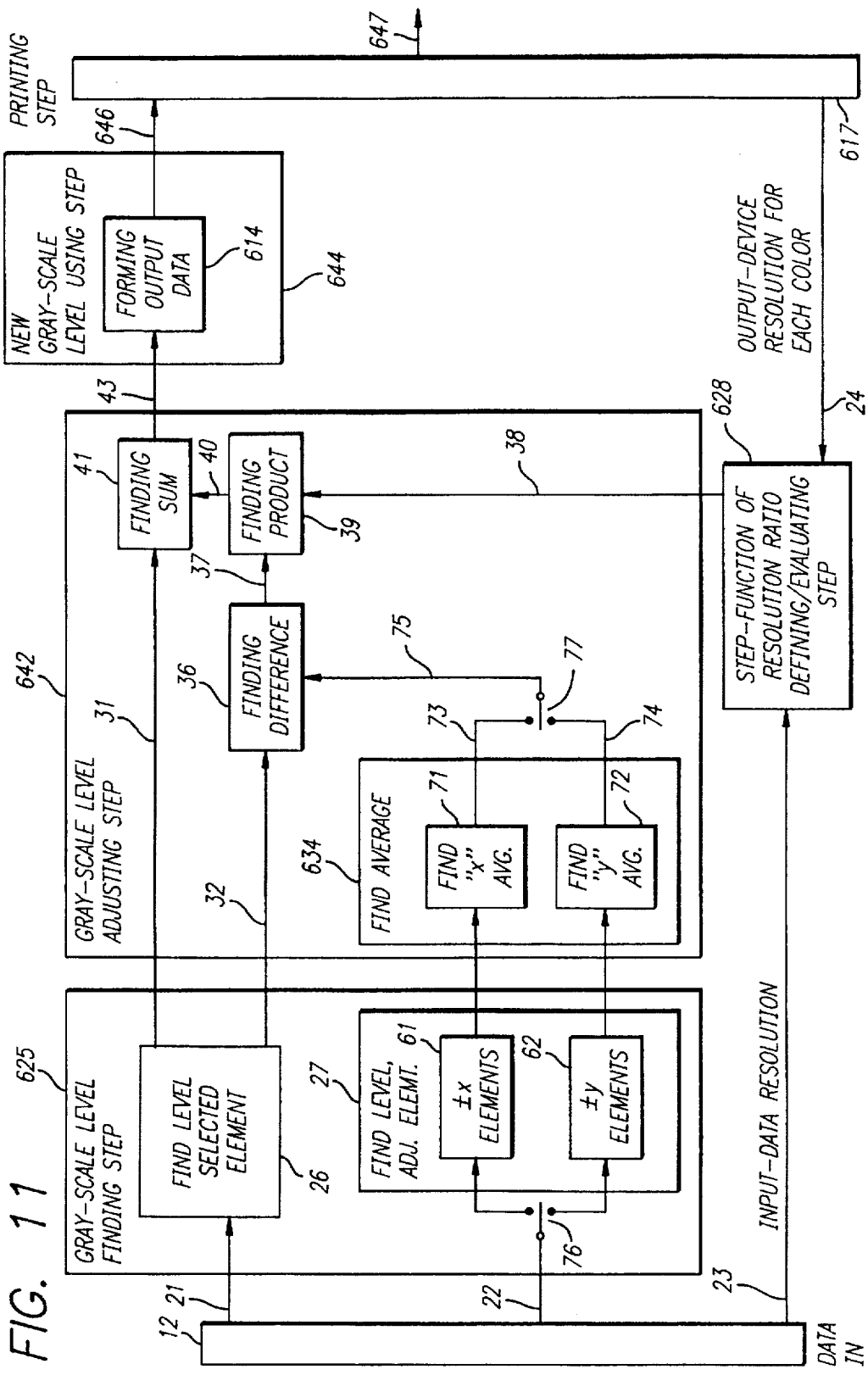

RESOLUTION-TRIGGERED SHARPENING FOR SCALING OF A DIGITAL-MATRIX IMAGE

RELATED PATENT DOCUMENTS

Portions of this document relate to the following copending applications which are commonly owned herewith, and incorporated herein by reference: Ser. No. 08/145,261, entitled "MIXED RESOLUTION PRINTING FOR COLOR AND MONOCHROME PRINTERS" and filed Oct. 29, 1993, in the names of Donald G. Harris, Majid Azmoon and Gary M. Nobel, and Ser. No. 08/400,056, entitled "MIXED-DENSITY PRINT MASKING IN A MIXED-SWATH-HEIGHT PRINTER" and filed Mar. 6, 1995, in the names of Nicholas Nicoloff, Jr., John M. Skene, Joseph H. Bauman, Donald G. Harris and Majid Azmoon, now abandoned.

BACKGROUND

1. Field of the Invention

This invention relates generally to digitally-controlled machines and procedures for printing—subject to enlargement or reduction—variable-density (gray-scale) text or graphics on printing media such as paper, transparency stock, or other glossy media; and more particularly to apparatus and method for preparing images to print on a scanning thermal-inkjet machine which constructs monochrome or multicolor text or images from ink spots created on a printing medium, in a two-dimensional pixel array.

2. Related Art

For purposes of this document the terms "enlargement" and "scaling up" encompass not only making an image physically larger, but, alternatively, increasing the number of pixels in the image. Depending upon the relative resolutions per unit length in an original image and a resulting image, the number of pixels may be increased even if the overall physical size is held constant or decreased; and the number of pixels may decrease—or may be constant—even if the physical size is increased.

In fact, "physical size" of an image in many cases is not a well-defined concept. Images are often defined only in terms of data arrays—which of course imply nothing about physical size.

(a) Basic and refined interpolation—U.S. Pat. No. 5,054,100 of Tai presents a helpful summary of systems used before 1989 to maintain the apparent sharpness of digital images being scaled down or, particularly, scaled up. In scaling up (enlargement), to expand the image new pixels must be inserted between preexisting pixels. The elementary problem is how to select a density value to assign to each newly inserted pixel.

Simply replicating the density value of existing pixels would be unacceptable, as such a process would tend to form rings of flat-density ledges, as on a topographic map, around each density peak, valley, ridge or other feature. Especially for relatively high factors of enlargement, the result would be a conspicuously unnatural stepped-density appearance.

A fundamental approach to selection of new density values for insertion pixels is linear interpolation between existing pixel densities of input image data. Tai points out that this technique too is unacceptable, but for a converse reason: preexisting sharp boundaries between regions of different density are excessively diluted in visual impact by the smoothing or blending effect that is inherent in interpolation.

The resulting version of the original image is too bland, lacking in crispness of definition—particularly in image regions where sharp edges appear in the original. Accordingly previous workers, as enumerated in the Tai patent, addressed various schemes for perturbing the interpolation process so as to preserve or recapture some essence of the subjectively perceived snap, or kick, in the initial image.

Considering the image-expansion process from a mathematical point of view, these lost elements are not solely emotional or abstract qualities but have objective physical reality in higher-order components of the density variation within an image. It is natural, therefore, to seek a solution through adding higher-order terms to the interpolation process—in other words to employ polynomial, for example quadratic or cubic, interpolation formulas.

Tai makes clear that in such processing it is necessary to strike a compromise between conflicting objectives: accuracy in restoring apparent image sharpness, and minimization of data-processing time during printing. As he recounts, some workers have evidently attempted to circumvent this conflict by calculating and tabulating in firmware, in advance, some weighting coefficients for use in real-time processing. Others premassage the entire image so that it is effectively precompensated for the blending effect of interpolation to be applied.

Whenever or wherever the extra calculations are performed, all such systems tend to suffer from undesirable cost-effectiveness economics. Such adverse relations may take the form of a real-time computational burden on the user, or an overall-price-influencing hardware overhead for which the user pays, or both.

Cost-effectiveness is particularly adverse in a system that blindly plunges through great volumes of computation for images, or in image areas, where computation is unnecessary. For example, all such computations are wasted if a particular image or portion actually has no sharp edges to maintain.

Thus Tai reports one prior system which undertakes to determine the presence of edges, and vary the processing in response. Related to this approach is Tai's own system, which evaluates the "strength" of an edge, and applies this "edge strength" to control weighting factors that in turn modify an interpolation process—which he describes somewhat inconsistently as "polynomial", "quadratic bilinear" and "bilinear" interpolation. Tai's interpolation process takes account of pixels that are adjacent not only along pixel rows and columns but also diagonally.

Tai's sharpening technique can operate simultaneously with determination of new pixel values for insertion (needing no pre- or postprocessing), and thus appears to be reasonably fast. In some embodiments it potentially avoids needless processing by, in effect, switching in needed weighting factors only where edge strength is within a specified range—namely, high enough to be worth retaining, but not so high that contrast still looks good even if the edge is degraded somewhat.

It appears that the Tai system should produce very high image quality, but it does remain computationally very intensive. In particular it tests edge strength throughout an image—and strengthens or sharpens the edge—even under some circumstances in which objectionable edge degradation cannot occur.

Recognition of this last point is considered part of the inventive contribution of the present invention, and so will be set forth more fully in a later "Summary of the Invention" section of this document.

(b) A sharpening algorithm—One technique that is commonly regarded as a standard form of so-called "edge enhancement" involves an initial analysis akin to Tai's, but most-typically simplified by omission of adjustment for diagonally adjacent pixels. This standard technique sharpens images by applying to each pixel an algorithm that performs a simplified form of interpolation.

FIG. 1 defines image positions to which the algorithm refers, namely five pixels in the input image. The five pixels are:

a subject pixel whose gray-scale value, or density, is to be adjusted—at array position (x,y)—and its four nearest neighbors at pixel positions (x−1,y) and (x+1,y) to the left and right, and (x,y−1) and (x,y+1) below and above.

FIG. 1 shows that positions varying by values of x—that is, measured along an x axis—correspond to a carriage-scan reciprocating direction that is symbolized in this drawing by a two-headed or bidirectional horizontal arrow 3C. Positions varying according to increasing values of y—positive movement along an orthogonal y axis—correspond to a medium-advance direction symbolized by a unidirectional (downward pointing) vertical arrow 3M.

Of interest are the gray-scale values V, or densities, at these five positions. The densities or gray-scale values are correspondingly written for the subject pixel V(x,y) and for the neighbors V(x−1,y), Y(x+1,y), V(x,y−1) and V(x,y+1).

In conventional terminology a new gray-scale value for the subject pixel is said to be a "sharpened value" $V_s$, or sometimes even a "sharpened pixel". It will be understood that this is only a verbal shorthand, since it is meaningless to speak literally of sharpening a single pixel or its gray-scale value as such, considered in isolation. The terminology of course means that the pixel gray-scale value is adjusted in such a way as to sharpen or enhance the contrast of the image in a region, surrounding the subject pixel, of varying gray-scale value.

To calculate a "sharpened" value V(x,y)s the initial unsharpened value V(x,y) and the neighboring values are combined with a "sharpening parameter" S in this way:

$$V(x,y)_s = V(x,y) + S \cdot \{V(x,y) - \tfrac{1}{4}[V(x-1,y)+V(x+1,y)+V(x,y-1)+V(x,y+1)]\}$$

This formula calls for averaging (in the second line of the formula) the gray-scale values for the neighbor pixels of (x,y). The neighboring-pixel gray-scale values may be collectively symbolized as $Y_{neighbors}$, and their average may be abbreviated as $\tfrac{1}{4}\Sigma V_{neighbors}$.

The formula subtracts that average from V(x,y)—to yield a difference $V(x,y) - \tfrac{1}{4}\Sigma V_{neighbors}$ that represents the gray-scale or density deviation, which may be written $\Delta V$, of the subject pixel from its average surroundings.

The formula then multiplies that resulting difference $\Delta V$ by the sharpening parameter S. This product $S \cdot \Delta V$ of the difference and the parameter S is an enhanced or exaggerated representation of the deviation of the subject pixel from its average surroundings—the degree or extent of the enhancement being of course set by the parameter S.

(In principle the same technique can be used to provide blending or smoothing by using values of S that are fractional—so that the deviation is partially suppression or constrained, rather than exaggerated or enhanced. That application is not of particular interest for present purposes.)

The exaggerated deviation $S \cdot \Delta V$ is then added back to the original "unsharpened" value V(x,y) to yield the "sharpened" value $V(x,y)_s = V(x,y) + S \cdot \Delta V$. People who are skilled in the art will appreciate that this sharpening on one hand may be totally ineffective, or may provide an excellent improvement, or on the other hand may introduce unsatisfactory excessive elevation of apparent contrast—and different results may obtain in different regions within a single image.

The actual result depends upon several unstated or uncontrolled factors such as for instance the magnitude of the sharpening parameter S, absolute values of the gray-scale numbers V and relationships between them, and the relative size of the deviation $\Delta V = V(x,y) - \tfrac{1}{4}\Sigma V_{neighbors}$ from surroundings. Still another factor is the subjective character or mood of the input image in the region of interest.

Of these uncertainties, the first mentioned—selection of the sharpening parameter S—presents a paramount difficulty. It is analogous to Tai's selection of his "weight factor multipliers", and critical to both the quality of the results and the operating speed or cost-effectiveness of the system.

In prior printing or print-preprocessing systems of which we are aware, the sharpening parameter S has been made either always a fixed value or entirely subject to control by a human operator. In the latter case, the operator typically can set S to zero, thus effectively turning off the sharpening function, or can select any desired value—within some permitted range—arbitrarily.

Thus desired degrees of sharpening can be explored and selected by the operator through trial and error. Machine time as such, in processing and printing each image, thus may be made quite modest—or at least appropriate to the circumstances—if the operator selects suitable values. This result, however, of course is obtained at the expense of a relatively massive burden on the time of the operator.

Furthermore the quality of the results in such systems depends upon the operator's perceptions (significant fractions of otherwise well-qualified operators are red-green colorblind), skill and patience. Since what is ideally desired in most cases is an output that bears a relatively straightforward or mechanistic relationship to the input data, such variability is usually a drawback.

Typically if the image is multichannel—for example, parallel planes or channels of red, green and blue ("RGB") data—then the entire sharpening-algorithm operation is performed separately for each channel. Naturally this overall approach multiplies the adverse time or cost burdens discussed above.

After the sharpening algorithm has been applied as described above, to form an intermediate image array, it still remains for the system to insert pixels and so expand (or to remove pixels and so contract) the image data to the number of overall pixels needed for the desired output image size—at the resolution of the output device that will be used. Establishing gray-scale values for inserted pixels is preferably done by strictly linear interpolation from the intermediate, but can employ the even simpler process of pixel replication if desired.

As a practical matter it is not necessary to process the entire image before beginning the interpolation or replication. Typically the sharpening and insertion can be accomplished in immediate succession using a rolling or progressively advancing window of the same height as the neighbors used in the sharpening algorithm (FIG. 1)—i.e., a three-pixel-row window.

If desired the actual printout of each pixel row can begin as soon as the sharpening-and-insertion window has advanced past that row. Thus the sharpening algorithm considered in the abstract—that is, apart from the indeterminacy in selection of the sharpening parameter S—represents an operationally practical approach. Selection of that parameter S, however, as made clear above, is severely problematic.

(c) Conclusion—Excessive or unjustified computation time and cost, or great impositions on operator time, patience and abilities, heretofore have continued to impede achievement of uniformly excellent but economical image scaling, preparatory to inkjet and other printing at high throughput. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first facet or aspect of its aspects, the invention is apparatus for preparing an image to print, on a print medium, as marks formed in an array. The array has some output-device resolution—that is to say, some resolution that is characteristic of an output device.

The apparatus performs this image-preparing task based upon input image data. This image data defines a pixel array that has some input-data resolution—some resolution that is characteristic of the input data.

Resolution information is stated as a number of image elements—usually pixels, for digital image data—per some distance. Perhaps most traditionally used in such definitions is a unit distance, yielding for example "pixels per millimeter" or "per inch".

For purposes of this document the reference distances are the entire image dimensions being scaled, not a unit distance, and thus yield resolution expressions such as "350 by 500 pixels" for a rectangular image. Thus in effect the resolution figures employed take account of the overall image-size change, as well as the input/output relationships with respect to fineness of detail in each elemental part of an image.

Input resolution on a unit-distance basis, and output resolution on a unit-distance basis, are usually isotropic —i. e., images usually have the same number of pixels per unit distance in two orthogonal directions (such as carriage-scan axis and print-medium advance axis). In many high-quality modern printers, however, this condition is not met, and for purposes of the present invention some special convention must be adopted to accommodate the divergence; some such details will be specified later in this document. A like accommodation may be made if desired to apply the invention to accommodate anamorphic enlargements—i. e. enlargement by different factors in two orthogonal directions.

The apparatus includes some means for finding at least one equivalent gray-scale level for a selected element of the input data. These means are also for finding at least one equivalent gray-scale level for, respectively, each of a plurality of elements of the input data that are near the selected element.

For purposes of generality and breadth in discussing the invention, these means may be called the "gray-scale-level finding means" or more simply the "finding means".

In describing the finding means we use the phrase "equivalent gray-scale level" to encompass both an actual gray-scale level, such as is found in a multilevel black-and-white image, and also data that may be used in forming any other monochrome image. Such a monochrome image may be for example an image all in different densities of, say, green, or magenta.

The terminology thus also encompasses systems that process plural (for example, three chromatic-color primary and one black) monochrome data channels or color "planes", for later assembly into a plural-color (for example full-color) image. In addition the terminology "equivalent gray-scale level" also encompasses finding a single overall equivalent gray-scale level—i. e., equivalent to a composite gray-scale level of a plural-color image portion —for use in printing a monochrome (for instance black-and-white) version of a plural-color image.

Besides the finding means, the apparatus of this first aspect of the invention also includes some means for automatically adjusting the equivalent gray-scale level for the selected element. The aim of this automatic adjustment is to derive a new equivalent gray-scale level which depends upon:

a function of both the output-device resolution and the input-data resolution, and the found equivalent gray-scale levels for the selected element and each of said plurality of near elements.

Here too for breadth and generality these means may be denominated the "adjusting means".

In describing the adjusting means we have used the phrase "to derive a new equivalent gray-scale level". By this terminology we encompass two general alternatives: the original data may itself be revised, actually substituting the new gray-scale level; or preferably the original data may be only used as a basis for preparation of a new intermediate data array, leaving the original data unchanged.

Further the apparatus includes some means for using the new equivalent gray-scale level to form corresponding output data having the output-device resolution. Once again it may be helpful to refer to these means as the "using means".

The using means may proceed by simple replication of pixels, or by some form of interpolation, or by combinations of these or other techniques—whether now known or unknown. The new equivalent gray-scale levels produced by the adjusting means can be made to, in effect, precondition the image so that contrast or sharpening of its internal edges will be satisfactory even after this later processing by the using means.

The foregoing may constitute a description or definition of the first facet of the invention in its broadest or most general form. Even in this general form, however, it can be seen that this aspect of the invention significantly mitigates the difficulties left unresolved in the art.

In particular, by controlling the gray-scale level in dependence upon the characteristic output and input resolutions, the image may be processed only to an extent that is justified by the number of new pixels to be inserted. This critical consideration, interestingly, is not found in the otherwise sophisticated analyses of Tai, or the heretofore known sharpening algorithms.

Hence the new equivalent gray-scale level may be made to diverge very strongly from the original level when the number of pixels at each location in the original image is to be cloned or interpolated by a relatively large multiplication factor such as two or more. At the same time the new equivalent gray-scale level may be made to diverge very little—or not at all—from the original when very few pixels are to be inserted.

The invention offers the opportunity to take advantage of this dependence on the relative input/output resolutions to effect great economies in data processing. Specifically, the resolution dependence can be used in such a way as to minimize or even eliminate data-processing—for the purpose of sharpening—when so few pixels will be inserted that little or no image-quality improvement can be gained by sharpening.

This economy is particularly valuable because the resolutions involved, in determining how to proceed, are applicable to the entire image—not piecemeal to different portions of the image. Thus the number of pieces of information to be evaluated in the decision-making stage typically amount to only one or two values for the input data and one or two values for the output device—in other words, most typically perhaps two to four quantities in all.

This means that a single very simple calculation, or sometimes a very few such calculations, are all that is needed to establish whether sharpening calculations are needed for an entire image—and, if so, the extent or scope of the calculations. The processing overhead involved in the present invention is, in short, negligible.

Although this aspect of the invention in its broad form thus represents a significant advance in the art, it is preferably practiced in conjunction with certain other features or characteristics that further enhance enjoyment of overall benefits.

For example, it is preferred that the apparatus be further combined with an output device, for printing the selected element on the print medium using the output data. Also preferably the output device includes a thermal-inkjet pen; and the finding, adjusting and using means include at least one digital microprocessor programmed to perform the finding, adjusting and using.

The apparatus itself preferably further includes means for defining and evaluating the function of both the output-device resolution and input-data resolution for the selected element. We consider it most preferable that the function be a function of the ratio of the input-data resolution to the output-device resolution for the selected element.

We prefer to make the function a step-function of that ratio. It has been found particularly advantageous to make the function on the order of two for certain values of the ratio, and on the order of zero for other values of the ratio.

Also preferably the function takes one value if the ratio does not exceed approximately one-half; and otherwise takes another value. Ideally the function is two if the ratio is one-half or less, and zero otherwise.

We consider it preferable that the new equivalent gray-scale level be substantially equal to:
  the found equivalent gray-scale level for the selected element, plus
  the product of (a) the function and (b) a function of the found equivalent gray-scale levels for the selected element and each of the plurality of near elements.

Still more preferably, the function "(b)" just mentioned is the difference between:
  the found equivalent gray-scale level for the selected element and
  an average of the found equivalent gray-scale levels for each of the plurality of near elements.

Special considerations come into play if the apparatus is intended for preparing such an image that is a color image, to print on an output device that includes means for selectively printing any of a plurality of colorants to mark the selected element on the print medium in color.

Here preferably the finding means include means for finding an equivalent gray-scale level with respect to each colorant of the plurality, for the selected element and for each of the plurality of near elements. Also preferably the adjusting means include means for adjusting the equivalent gray-scale level for each colorant of the plurality, to derive a new equivalent gray-scale level. This new gray-scale level depends upon:
  a function of both the output-device resolution and the input-data resolution for that colorant respectively, and
  the found equivalent gray-scale levels with respect to that colorant, for the selected element and each of the plurality of near elements.

Preferred embodiments of the first aspect or phase of the invention further include some means for rendition of the new equivalent gray-scale level in a binary pixel array: for reasons to be explored later, the invention has been found particularly efficacious in the environment of a binary (single-bit) color printing system. Preferably too the finding means employ, for the plurality of "near" elements, elements that are substantially adjacent to the selected element.

Moreover the new equivalent gray-scale level preferably depends on the input/output-resolution function and the equivalent gray-scale levels substantially exclusively. In this regard, as mentioned earlier, each resolution value to which the terminology used in this document refers is the number of pixels per entire image, not per unit distance.

Preferred embodiments of a second main facet or aspect of the invention, too, take the form of apparatus for preparing an image to print on a print medium as marks formed in an array having output-device resolution, based upon input image data defining a pixel array having input-data resolution. The definitions of "resolution" employed here as throughout this document are the same as set forth above for the first main aspect of the invention.

In this case, however, the apparatus includes some means for using the input data to form corresponding output data having the output-device resolution. The apparatus also includes some means for finding at least one equivalent gray-scale level for a selected element of the output data, and for each of a plurality of elements of the output data that are near the selected element.

In addition the apparatus includes some means for automatically adjusting the equivalent gray-scale level for the selected element to a new equivalent gray-scale level which depends upon:
  a function of both the output-device resolution and the input-data resolution, and
  the found equivalent gray-scale levels for the selected element and each of the plurality of near elements.

Thus in very broad terms it can be seen that this second aspect of the invention has using, finding and adjusting means that are very roughly analogous to the using, finding and adjusting means of the first aspect.

They are not, however, identical or interchangeable. The order in which they operate on the successive forms of the data is different, as between the two aspects.

In the first broad aspect of the invention, data definition ("finding") precedes pixel sharpening ("adjusting" the found data), which in turn precedes pixel expansion ("using" the adjusted data). In this second aspect, pixel expansion ("using") comes first, and then data selection ("finding" the expanded data), and then sharpening ("adjusting" the found data).

In general for enlargements, or at least for increases in resolution as defined in this document, the first aspect of the invention is preferable to the second —because the first aspect of the invention performs sharpening calculations while the amount of data in the image is still smaller, but the second aspect sharpens all of the expanded data. The Tai reference, discussed earlier, makes this point.

The sharpening of expanded data, however, does produce different output quality or at least visual impact, and this different output may be advantageous in some situations simply because some operators or customers, etc. may prefer it. Thus a significant comparison is between operation of the second aspect of the invention and prior systems that likewise sharpen expanded data.

In this regard the present invention is superior to such prior systems, in that limited or no sharpening is performed when resolution relationships do not call for heavy, or any, sharpening. In fact the advantage of the present invention over the prior art is even more significant for this second aspect of the invention than for the first, because the amount of superfluous data processing that can be avoided in this case is much more extensive and time consuming.

Although this second aspect of the invention in its broad form thus represents a significant advance in the art, it is preferably practiced in conjunction with certain other features or characteristics that further enhance enjoyment of overall benefits. Generally most of the same preferences mentioned above for the first aspect of the invention are applicable to this second aspect too.

In preferred embodiments of a third basic aspect or facet, like the first two, the invention is apparatus for preparing to print an image on a print medium as marks formed in an array having output-device resolution, based upon input image data defining a pixel array having input-data resolution.

The apparatus includes some means for enhancing contrast within the image. In the interest of breadth and generality we will call these means the "enhancing means". (As will be understood, these means have the effect of sharpening the image, and if desired may be used in association with—i. e., just before or after—scaling of the image.)

This apparatus also includes some means for automatically turning the enhancing means on or off selectively. The turning of the enhancing means on or off is made to depend on a relationship between the output-device resolution and the input-data resolution.

The foregoing may constitute a description or definition of the third facet of the invention in its broadest or most general form. Even in this general form, however, it can be seen that this aspect of the invention too significantly mitigates the difficulties left unresolved in the art.

In particular the input/output-device resolution relations are used to determine whether image enhancement (e. g. sharpening) is performed at all. Enhancement is performed for some resolution relationships but not others.

As will be clear to people skilled in this field, this aspect of the invention provides an opportunity to entirely eliminate time-consuming enhancement processing when little can be gained by such processing—specifically for example, when not enough pixels are being inserted to make the inherent blending or smoothing effects of pixel insertion noticeable.

Here too such benefits can be optimized through incorporation of additional features or characteristics. Most of the preferable points mentioned earlier in relation to the first aspect of the invention are applicable to this third aspect as well.

In preferred embodiments of a fourth of its aspects, the invention is a method of printing an image on a print medium. Such an image is printed as marks formed in an array having output-device resolution, based upon input image data defining a pixel array having input-data resolution.

The method includes the step of finding at least one equivalent gray-scale level for a selected element of the input data—and for each of a plurality of elements of the input data that are near the selected element—respectively.

The method also includes the step of automatically adjusting the equivalent gray-scale level for the selected element to derive a new equivalent gray-scale level. The new equivalent gray-scale level depends upon:

a function of both the output-device resolution and the input-data resolution, and the found equivalent gray-scale levels for the selected element and each of said plurality of near elements.

The method also includes the step of using the new equivalent gray-scale level to form corresponding output data having the output-device resolution. In addition the method includes the step of printing the selected element on the print medium using the output data.

Practice of this method enjoys generally the same advances over the prior art as use of the apparatus described earlier in a preferred embodiment of the first aspect of the invention. Related preferable forms of the apparatus are applicable here too, as preferable modes of practicing the method.

Additional preferences are stated below for this method aspect of the invention. These preferences conversely have advantageous analogues in the apparatus aspects of the invention.

A first preference arises when the method is used for printing an image in color, using an output device that has different resolutions for different colors. In this case preferably the function is a function of all the resolutions for the colors which the output device can print.

More specifically it is preferable that the overall function—that is, the above-mentioned function of all the resolutions—be such that the individual resolution function used for each color is a function of the output-device and input-data resolution for that same color.

A second preference arises when using an output device that has different resolutions along different dimensions along different dimensions of the mark-formed array, or when using an input image that has different resolutions along different dimensions of the input data, or both. Here it is preferable that the function be a function of all the resolutions for the different dimensions.

More specifically it is preferable that the overall function—that is, the just-mentioned function of all the resolutions—include weighted functions used with respect to each common dimension, respectively, of the input-data pixel array and the mark-formed (output) array. In other words one weighted function may be used with respect to the width (or carriage-scan dimension) of the input and output arrays; and another one weighted function may be used with respect to the height (or medium-advance dimension) of the input and output arrays.

An alternative preference, within the general preference for using a function of all the resolutions, is that the finding step include finding the at least one equivalent gray-scale level for each of a plurality of elements of the input data that are near the selected element along, exclusively, a particular common dimension of the input-data pixel array and the mark-formed array. In other words, this form of the invention ignores elements along the orthogonal dimension from the selected element—i. e., the weighing factors mentioned in the preceding paragraph are set equal to zero for that orthogonal dimension.

An example will make this more clear. Suppose that the two resolutions of the output device expressed on a unit-distance basis are 600 pixels per inch along the carriage scan axis and 300 pixels per inch along the print-medium advance axis. The system outlined in the preceding paragraph would use only either the 600 or 300 figure, not both. Since the output-device characteristics are known in advance, the selection of which axis to use can be made by the system designer: for instance, if desired the system may be programmed to use the 600-pixel figure, as this corresponds to the direction in which undesirable image blending or smoothing will be most troublesome.

In this alternative case, the adjusting step then proceeds based upon exclusively the elements along the selected dimension. Thus the new equivalent gray-scale level depends upon the function and the found levels for the selected element and, exclusively, the elements along the particular common dimension.

All of the foregoing operational principles and advantages of the present invention will be more fully appreciated upon consideration of the following detailed description, with reference to the appended drawings, of which:

BRIEF DESCRIPTION OF THE DRAWINGS

FIG. 11 is a like diagram showing an alternative exemplary embodiment of the FIG. 9 method.

DETAILED DESCRIPTION OF THE PREFERRED EMBODIMENTS

Figures 1, 2:
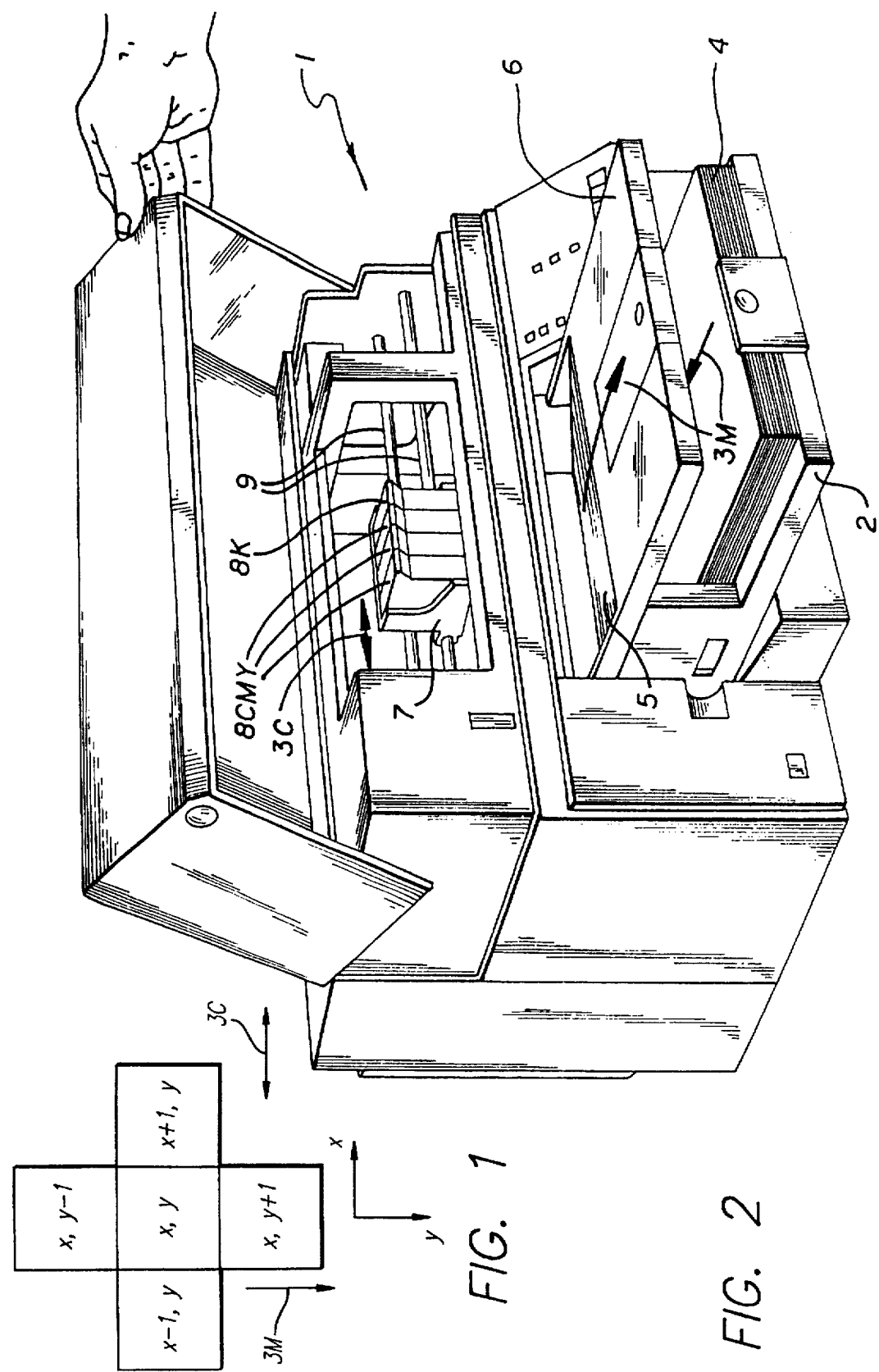
FIG. 1 is a diagram defining pixel-grid positions for the geometrical relationship between a subject pixel to be adjusted or "sharpened" and its adjacent neighbors.
FIG. 2 is a perspective view of a printer that may be used as the "output device" with the invention, or as part of the invention.

FIG. 2 illustrates an output device 1 capable of implementing the geometrical relationships of FIG. 1. The device 1 is a thermal-inkjet ("TIJ") printer with a tray 2 for holding sheets 4 of printing medium ready for use, and a printed-image exit region 5 and storage shelf 6.

A print-medium advance mechanism within the printer 1 picks up an individual sheet 4 of medium and moves the sheet along a medium-advance direction 3M which corresponds to the like direction 3M in FIG. 1. For purposes of this document the advance mechanism too, which is generally conventional, may be regarded as symbolized by the arrow 3M.

Figure 3:
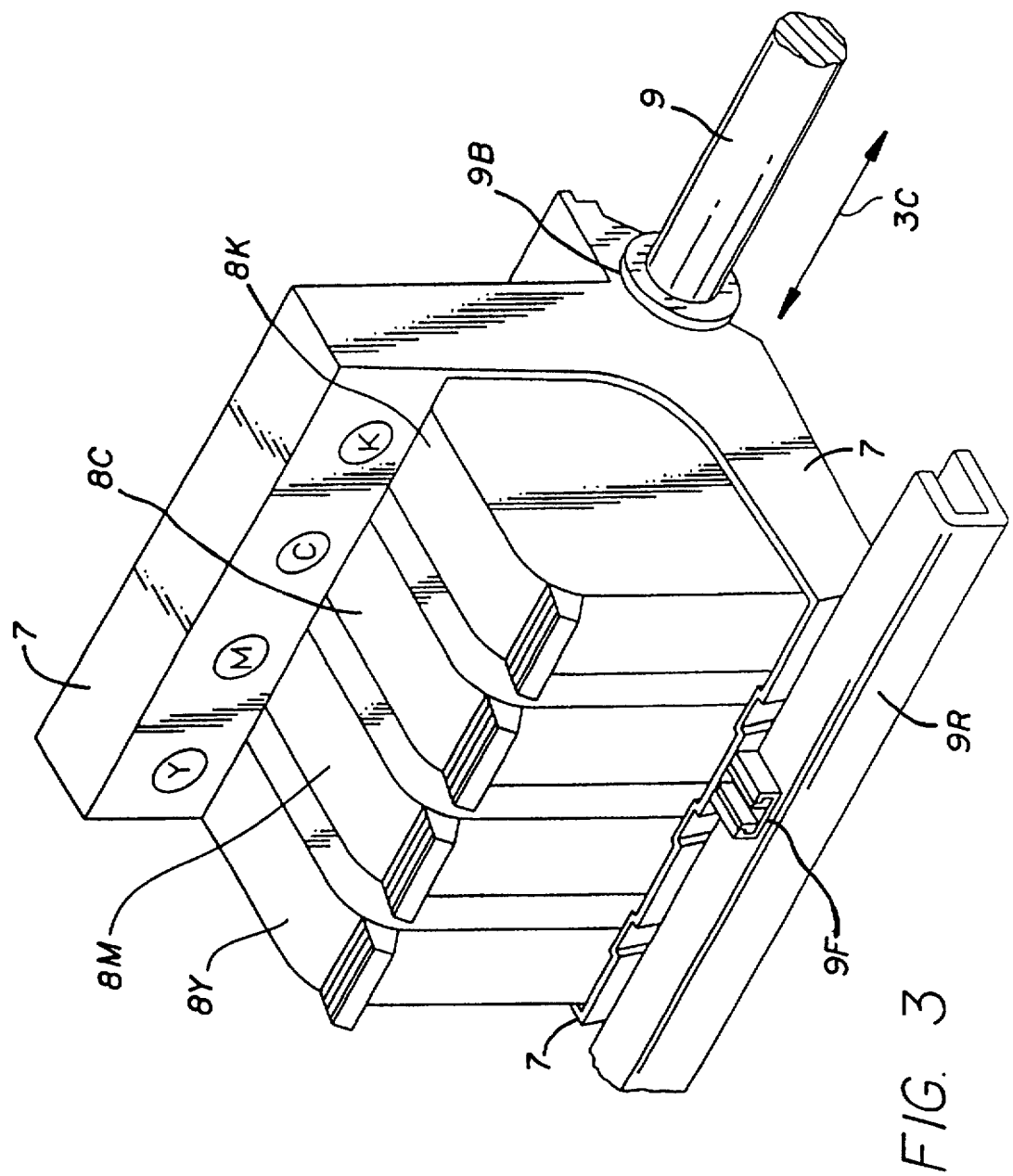
FIG. 3 is a like view, but enlarged, of a pen carriage that may form part of the FIG. 2 printer.

The printer 1 also includes a carriage 7 that holds three color pens 8CMY and one black pen 8K. The carriage is supported for motion on a system of rods 9, bearings 9B (FIG. 3), a rail 9R and a rail follower 9F.

The carriage motion 3C is reciprocating and corresponds to the like direction 3C in FIG. 1. Thus the pens are held in marking positions above an individual sheet 4 of medium that is partway along its longitudinal path 3M through the system, and the pens bidirectionally scan over the sheet 4 of medium transversely—while marking on the sheet 4 to create an image.

The image to be printed may arise in any of a very great number of ways. For example it may be created as digital data using a programmed digital microprocessor—most typically part of a general-purpose computer that includes a display screen for viewing the image during its creation, and that is functionally interconnected with the printer 1 for producing a so-called "hard copy" on paper.

Alternatively the image may be originally a photo or a handmade drawing or painting that is captured as digital image data using an optoelectronic scanner, or may be recorded as data representing physical processes, financial data etc. Image data may be created in other ways that are known, and some ways that are not yet known.

Generally speaking all such image data may be satisfactorily processed in accordance with the present invention; however, the invention is most effective and most useful with natural pictorial image types. By this we mean photos, paintings or drawings of people and scenes, in which small details when closely examined seem to have a degree of randomness.

Image data once assembled may be recorded on any of various types of storage media, and may be carried on such media for copying into another computer—or transmitted by phone, radio, optical or other Transmission systems for copying into a remote computer—that has an output device 1 for printing the image.

A set of digital image data merely represents an image in terms of intensities or densities or one or more colorants at a number of positions or "picture elements", "pixels", into which the image area has been divided. Generally the data set as such contains no indication of the physical size of an individual pixel or of the overall image.

Often physical size is not of direct interest—since usable, visible reproductions on a display screen or printing medium may be made at any of a great number of desired sizes. Nevertheless for purposes of discussion FIG. 4 shows actual size relationships between an original picture 11, a portion 12 of that picture which is to be reproduced 14 using a printer, and the finished printout 15 of that desired portion 12.

For clarity of illustration, each pixel diagram in this document has been prepared with many fewer pixels than a typical image of interest. Those skilled in the art know well that a typical image is hundreds of pixels on each side.

Commonly encountered pixel counts range from at least several dozen into the thousands. Nevertheless, the diagrams in this document are adequately representative to help explain the purposes and practice of the invention.

Figure 4:
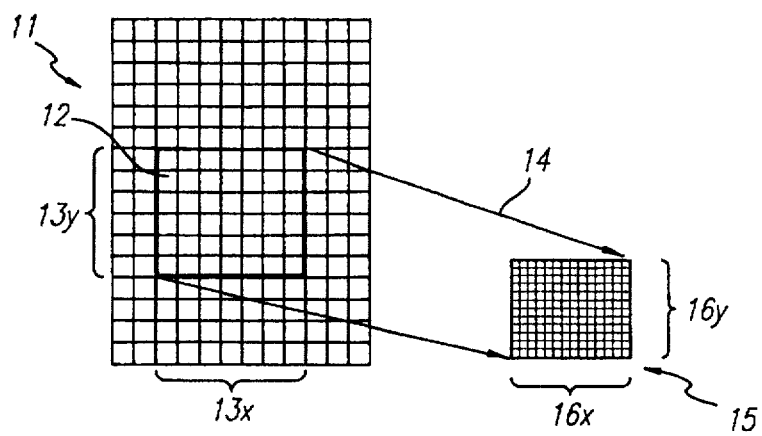
FIG. 4 is a diagram of possible relationships between input-data resolution and output-device resolution, for a monochrome case.

As FIG. 4 shows, not only the whole original picture 11 but also the portion 12 to be reproduced is physically larger than the desired printout 15 of the portion 12. Nevertheless, for the example shown the reproduction process 14 is an "enlargement" within the meaning of that term introduced earlier in that document—namely, that the number of pixels in the printout 15 is greater than the number in the portion 12 to be reproduced.

Such relationships are possible because, as FIG. 4 shows, the actual, physical pixel spacing in the original 11 is much coarser than that in the printout 15. The portion 12 is seven pixels across its horizontal (carriage-scan axis) dimension 13x; and six pixels along its vertical (medium-advance axis) dimension 13y.

The reproduction or printout 15 is in the same proportions, but in actual physical size only about three-quarters as big in each direction. It has fourteen pixels across its horizontal dimension 16x, and twelve pixels along its vertical dimension 16y—twice as many in each direction as in the original portion 12, so each pixel side in the printed output is only about three-eighths the length of each pixel side in the original 11, 12.

Within the terminology of this document, the reproduction process 14 is an enlargement by a factor of two in each direction, which is to say from seven pixels across to fourteen pixels across, and from six down to twelve down. This is accordingly a relatively simple case, for images 12 may be subject to compound enlargement factors (or even simultaneous enlargement and reduction) where plural colors or anisotropic resolution—or both—are involved as in FIG. 5.

Figure 5:
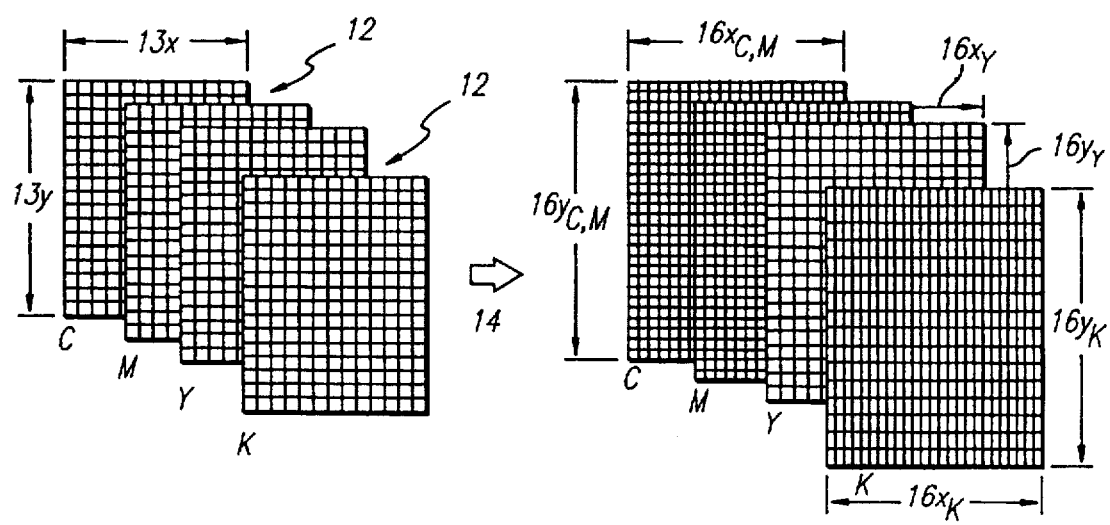
FIG. 5 is a like diagram of such relations for a four-colorant case—very generally corresponding to the FIG. 2 pen carriage.

FIG. 5 represents an original image portion 12 with data subsets C, M, Y and K for four colorants or primary colors cyan, magenta, yellow and black respectively—sometimes called different color "channels" or more commonly different color "planes". The input data are assumed to have a single common resolution value for all four colors: the pixel spacing is drawn the same in all four color planes.

These input data are also assumed to be isotropic in resolution: the pixel spacing has been drawn the same along the horizontal and vertical axes x and y respectively. The image portion itself, however, is not square but rectangular, being seventeen pixels tall (the vertical dimension 13y) and thirteen wide (horizontal dimension 13x).

The output form of the same data, after image processing 14 to format the data for an output device (such as the printer 1), has been drawn variegated in resolution to illustrate the kinds of compound enlargement situations that can arise. The color-data planes C, M, Y are isotropic, and pixels in the data planes C, M for printing cyan and magenta are a common size—but this is only three-quarters the size (along each side) of pixels in the data plane Y for yellow.

Pixels in the plane K for printing black are strongly anisotropic—twice as tall as they are wide. They are also different in both dimensions from pixels in all three planes C, M, Y for printing chromatic colors. For instance in comparison with pixels in the data Y for yellow, the pixels in the data K for black are five-fourths as tall (1.2 times taller) and five-eighths as wide.

More significantly for purposes of the present invention, all these output-device pixel dimensions bear various relationships to the pixel dimensions for the input data 12. To determine the factor of "enlargement" or "reduction" as herein defined, it is necessary to take into account also the overall input-image dimensions 13x, 13y and output-image dimensions 16x, 16y for all four output-device data planes (that is, $16x_{C,M}$ and $16y_{C,M}$ for cyan and magenta, $16xy$ and $16yy$ for yellow, and $16x_K$ and $16y_K$ for black).

In this tabulation the "scale factor" column represents the "enlargement" as herein defined, the final figure (being less than one) accordingly representing a reduction.

| color | direction | pixel scale factor | frame scale factor | enlargement |
|---|---|---|---|---|
| cyan | both | 4/3 | x 7/6 | 1.56 |
| magenta | both | 4/3 | x 7/6 | 1.56 |
| yellow | both | 1 | x 7/6 | 1.17 |
| black | horizontal | 8/5 | x 7/6 | 1.87 |
|  | vertical | 4/5 | x 7/6 | 0.93 |

As will be understood, approximately the same ratios (not exactly, because the data planes were rot drawn with integral numbers of pixels across and down all frames) can be obtained more simply by merely counting pixels across and down the input- and output-data frames:

| color | direction | pixels, input frame | pixels, output frame | enlargement |
|---|---|---|---|---|
| cyan | horizontal | 13 | 21 | 1.62 |
|  | vertical | 17 | 27 | 1.59 |
| magenta | horizontal | 13 | 21 | 1.62 |
|  | vertical | 17 | 27 | 1.59 |
| yellow | horizontal | 13 | 16 | 1.23 |
|  | vertical | 17 | 20 | 1.18 |
| black | horizontal | 13 | 25 | 1.92 |
|  | vertical | 17 | 16 | 0.94 |

(In images with more-typically very large numbers of pixels, the effects of one fractional pixel across an entire frame would be negligible and the enlargement ratios more accurate.)

The various "enlargement" factors or "resolution" relationships of FIG. 5 can be important to practice of the present invention because they demonstrate that a function of the input-data and output-device resolutions may be a compound or hybrid function. Its complexities must be addressed, though not necessarily in a complicated way, to enable practice of the invention with output devices having these kinds of resolution relationship.

Actual resolution relations of this sort may represent a very desirable mode of practice of the invention when used with certain printers that have different resolutions for different dimensions, or as between different primary colors. The patent documents enumerated earlier, in the Related Patent Documents section, set forth such details.

Figure 6:
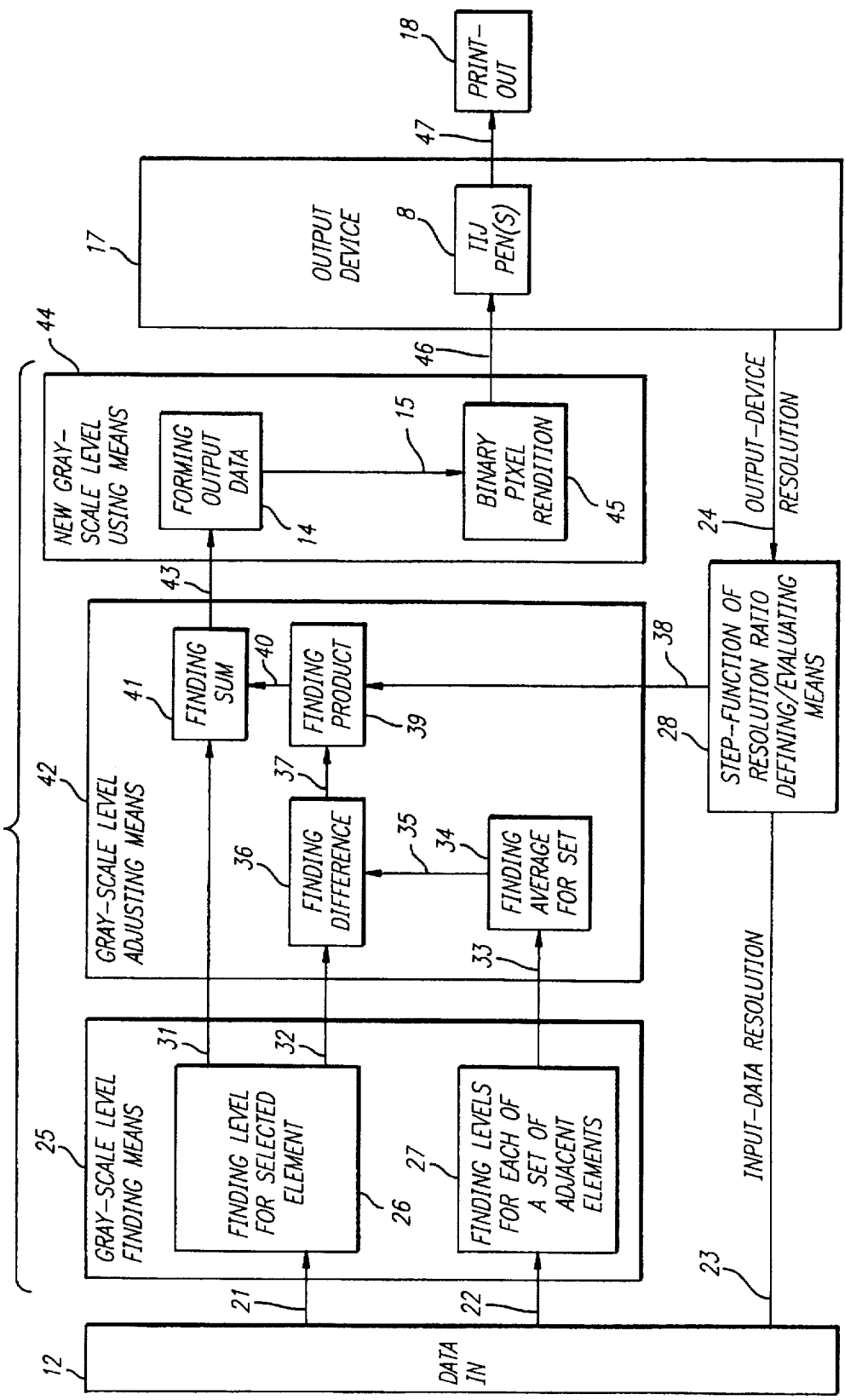
FIG. 6 is a block-diagrammatic representation of a preferred hardware system according to the first aspect of the invention.

FIG. 6 shows one preferred embodiment of the apparatus of the invention as it works on image data 21 for—typically—one selected pixel such as x,y of FIG. 1, but taking into account data 22 for—typically—the four nearest-adjacent pixels. FIG. 6 deals with the relatively simple case of a monochrome image portion 12 to be printed, but may also represent processing of such an image portion 12 that is a single monochrome channel or plane in a plural-color image.

An input reading or "finding" stage 25 of the apparatus provides one data pathway 26 that finds and reads V(x,y) —the selected-pixel data 21—and a second data path 27 that finds and reads $V_{neighbors}$, the adjacent-pixel set 22. In the drawings as in the claims, the term "element" is used rather than "pixel" because some systems operate on groups of pixels, rather than individual pixels, as elementary units.

As seen, the system also reads and uses a third type of information 23 derived from the input image portion 12, namely the "input-data resolution,"—which is the number of pixels along an edge of the image portion 12. For some systems that operate on plural-pixel elements as mentioned above, it may be desirable to adapt the definition of "resolution" as will be clear to those skilled in the art.

The second data path 27 transmits equivalent gray-scale levels 33 for the adjacent elements to an intermediate level-adjusting stage 42, in which one module 34 finds their average 35—which corresponds to the previously introduced notation $\frac{1}{4}\Sigma V_{neighbors}$. A second module 36 finds the difference 37—which is $\Delta V = V(x,y) - \frac{1}{4}\Sigma V_{neighbors}$— between this average 36 and the gray-scale level 32 for the selected element.

A fourth module 39 multiplies the difference 37 by the previously mentioned sharpening parameter 38—which corresponds to the parameter S in the sharpening algorithm presented earlier. This parameter is supplied by a separate module 28 which operates to define and evaluate a function of the input and output resolutions 23, 24—for simplicity preferably, as noted in the drawing, a step-function of the ratio of the two resolution values.

The defining-and-evaluating means 28 receives the input-data resolution FIG. 23 mentioned above, and also reads the output-device resolution 24. While this parameter 24 appears in the drawing as provided by the output device 17, naturally in some systems this information is prestored in the microprocessor system (e. g., computer) that performs these preliminary operations.

For example, the module 28 may be part of a computer that has been programmed to run printer-driver software, and the computer may have received the output-device resolution information 24 from the printer driver—which is typically operator-selected and -installed for an individual printer 17. In this case the computer then reads this information 24 from its own memory.

Whether derived in that manner or by interrogation of the printer 17 as illustrated, the output resolution 24 is combined with the input resolution 23 in the defining-and-evaluating means 28, and the prescribed function 38 is applied as the sharpening parameter S to the multiplication module 39. Making the function 38 (sharpening parameter S) a function of the two resolution values 23, 24 enables the system to perform relatively more extensive sharpening (higher S values) in some cases and relatively less (lower S values) in others—or, in a particularly efficient preferred embodiment, to perform sharpening when it is needed, and omit sharpening when it is not needed.

The output 40 of this multiplication stage 39—which is the correction or adjustment term S·ΔV—is added back to the selected-pixel level 31, V(x,y), within a summing module 41. The result is the adjusted gray-scale level 43 for the selected pixel—V(x,y)s—which then leaves the adjusting stage 42.

In the next stage 44 the adjusted gray-scale level 43 passes into an output-stage or "using" stage 44, which forms 14 output data 15—by performing the image expansion (or contraction process 14 of FIGS. 4 and 5. The case of expansion is of greater interest relative to the present invention, since it is expansion which requires insertion of new pixels by replication or interpolation—and it is these processes which tend to excessively smooth or blend the image.

Several or other processes typically occur in an output stage 44, or in an output device 17 itself, or functionally divided between these two subsystems. For example if the output device is a one-bit binary printer, binary pixel rendition 45 may be performed within the output or "using" stage 44 of the programmed microprocessor. Color correction may be performed between the expansion and rendition modules 14, 45—or earlier, as for example in formation of the input data 12.

In any event the microprocessor output 46 eventually passes to the output device 17, for control of marking devices such as a TIJ pen or pens 8. These in turn produce marks 47 to create the desired printout 18.

In the remaining drawings, features related to those of FIG. 6 are designated by the same reference numerals that appear in FIG. 6. Where appropriate to call attention to variant functions, prefixes "1", "2" etc. are appended in the hundreds position.

Figure 7:
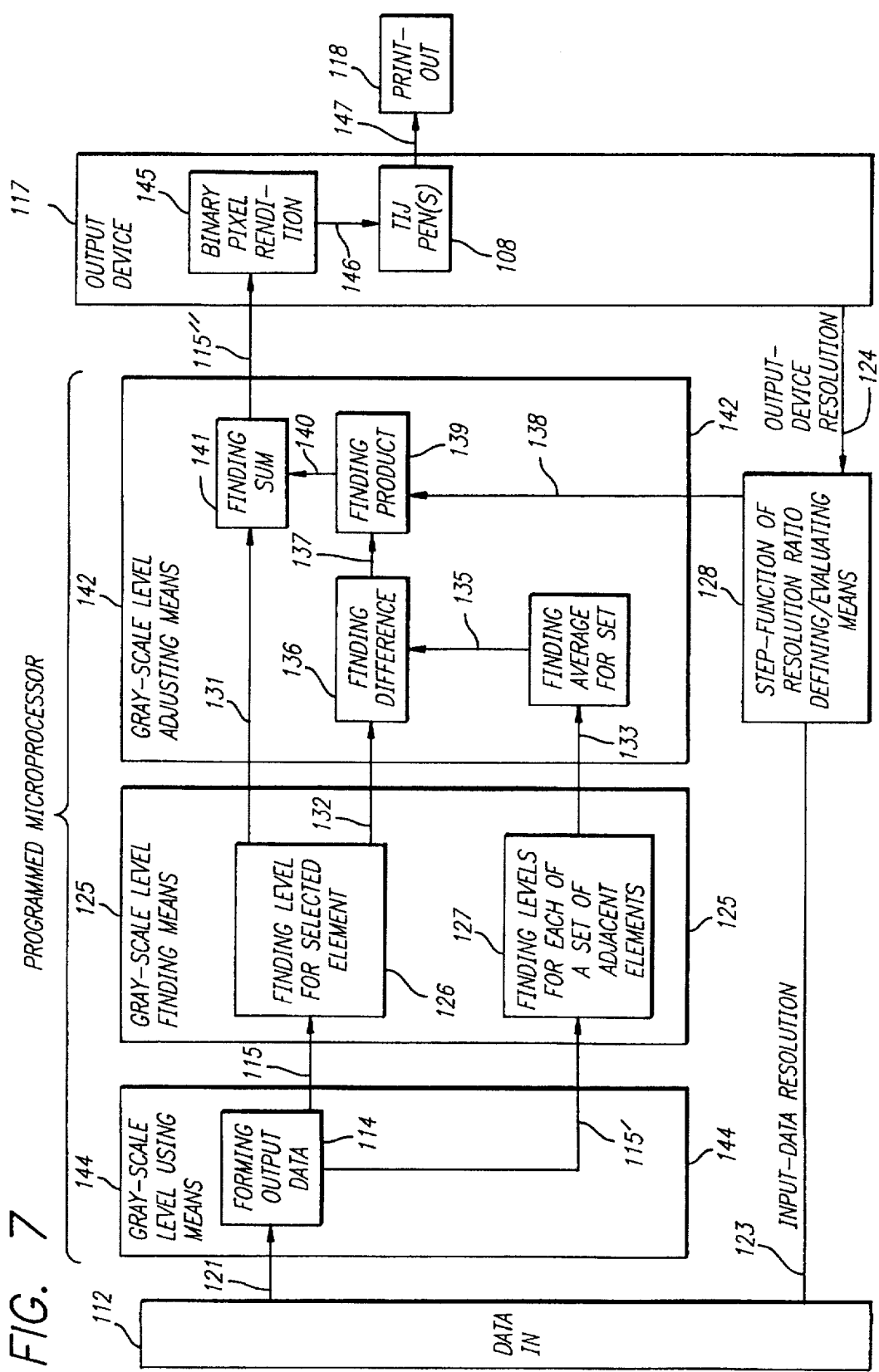
FIG. 7 is a like diagram corresponding to the second main facet or aspect of the invention.

Thus in FIG. 7 the expansion process 114 precedes sharpening (rather than following as in FIG. 6), so the input data 112 operates differently (from the data 12 of FIG. 6) in that it provides only one data line 121 (rather than two 21, 22 as in FIG. 6). The expansion or output-data "forming" process 114 occurs in an input or data-using stage 144, generating two output-signal sets: the equivalent gray-scale level 115 for the selected pixel, and equivalent gray-scale levels 115' for its neighbors.

These signals proceed to the subsequent modules 125, 142 which operate very much as in the FIG. 6 system, except that in the now already-expanded data there are many more pixels to process. This system is accordingly disfavored, unless special circumstances lead to much better image quality through this inverted sequence.

The resolution-function defining-and-evaluating module 128 provides a sharpening parameter 138 very much as in the FIG. 6 system. As in that system the value of the parameter 138 is preferably the result of a function of the resolution ratio—and still more preferably a step-function of that ratio. In a sense the usefulness of this part of the system is even greater than in FIG. 6, since here the stakes are higher: the amount of processing that can be wasted in this system is potentially dozens or even hundreds of times greater than in the FIG. 6 system.

For convenience of illustration, in FIG. 7 the rendition process 145 is shown as being performed by the output device 117, rather than within the computer or other programmed-microprocessor system 144-125-142. Accordingly in this case the output 115" of the processor system has not yet been subjected to rendition.

Figure 8:
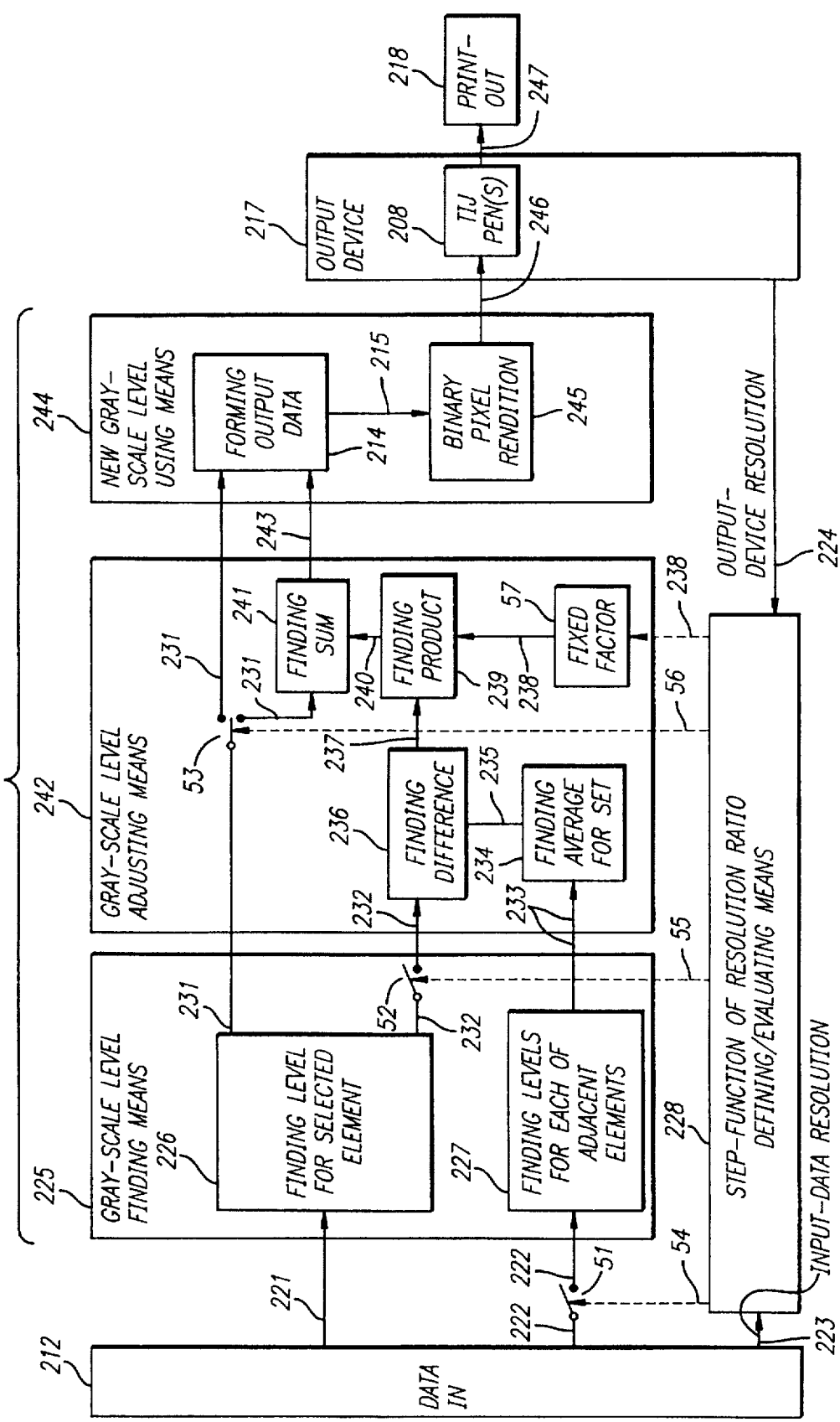
FIG. 8 is a like diagram corresponding to the third facet of invention.

FIG. 8 represents a very important special case of the FIG. 6 system. If the resolution function in FIG. 6 yields a sharpening parameter value of zero, the drawing may be interpreted to mean that the system performs all of the process steps in the adjacent-element data path including multiplication by zero.

This pointless processing would be even more wasteful than actually computing some small adjustment value (representing an adjustment of perhaps-marginal significance), and incorporating the resulting adjustment into the output data for printing. FIG. 8 indicates that all processing in the adjacent-element data path is turned off, not performed at all, when the results of that processing will not be used.

For this purpose three toggle-switch symbols 51–53 are incorporated into FIG. 8; with these symbols there shall be understood this convention: process modules lacking all necessary inputs do not operate. Naturally physical toggle switches are not normally employed; rather the corresponding processes are simply suppressed by software control.

All three "toggle switches" or process-suppressing input control points are actuated by the module 228 that defines and evaluates the resolution ratio. When this module indicates that enlargement by a sufficiently high factor is occurring, it (figuratively speaking) rotates 54, 55, 56 the movable arm of each toggle switch symbol downward to close the first two switches 51 and 52, and direct the input level 221, 231 through the lower contact of the third switch 53 to the sum-finding module 241.

The neighbor-level inputs 222 then pass through the first switch 51 to the neighbor-level finding and averaging modules 227, 234, actuating these modules to operate and transmit an average 235 into the differencing module 236. Selected-pixel information 232 also passes through the second switch 52 to the same differencing module 236.

These two inputs actuate the differencing module to compute and direct a difference 237 to the multiplication module 239, and that module multiplies the difference 237 by a fixed factor 57—established 238 by the resolution-function module 228.

The resulting product 240 is added in the summing module 241 to the input level 221, 231 received through switch 53 as mentioned above, generating an adjusted level 243—which proceeds from the adjusting stage to the using stage 244. From the foregoing it will be understood that for adequately high resolution ratios the system operates exactly as in FIG. 6.

For low (including fractional) resolution ratios, however, the "toggle switch" arms all move upward—cutting off all inputs and therefore all operation of the neighbor-level processing modules 227, 234, 236, 239, 241. The upward-rotated arm of the third toggle switch 53 also pipes the input level 221, 231 through the otherwise-disabled adjusting stage directly out to the level-using stage 244. That stage prepares 214 output data 215,246—that have not been sharpened—for passage to the output device 217.

FIG. 8 thus represents one form of step-function system, i. e. a system in which some step-function of the two resolution values 23, 24 is formed 228 and made to control 54, 55, 56, 238/57the system processing. Here:

the step-function has exactly two states;

the resulting control is either on or off; and when it is on, only one factor 57 is used in weighting (multiplying by the sharpening parameter S) the deviation of the selected element level V(x,y) from its average surroundings.

Even with a step-function, a relatively elaborate function of the two resolution values 223, 224 could be used as a basis or trigger. For instance the function could be a polynomial, or a compound fraction, employing those two values. We have found it satisfactory to make the basis function a simple ratio: the output-device resolution 224 divided by the input-device resolution 223.

Regardless of the triggering function, the use of a step-function calls for some sort of cut-off value at which the output undergoes its step. We have found it particularly useful to turn the full processing on if the ratio of resolutions is more than two, and off if it is two or less.

Also to be established is the sharpening factor S (the fixed factor 57 in FIG. 8) which is employed when the step-function is "on". Our work has included collecting opinions of visual acceptability from representative users, for a considerable range of values of the sharpening-factor S.

General agreement was obtained that a sharpening factor of two provided distinct improvement over an unsharpened image, for essentially all large values of the resolution ratio—although many respondents reported definite esthetic preference for images prepared using a value as high as four. Objectively, such a high value is undesirable because it can lead to extremely conspicuous artifacts if the original image has small, subtle imperfections—specks, dots, hairlines, etc.—that are processed by the sharpening.

We therefore consider it ideal to use a sharpening factor of two. Any value between, very roughly speaking, about 1¾ and 2½ will yield nearly equivalent results, and values between about 1 and 3 will yield results that are quite acceptable to representative users.

We believe that implementing the invention with a simple step-function of resolution produces satisfactory results even with output devices that actually print multiple density levels. Such implementation with a simple step-function is especially successful, however, with an output device that uses single-bit binary rendition. This means the device simply either prints or does not print one unit quantity of ink, which is consistent with respect to each colorant, in each element of the image.

Figure 9:
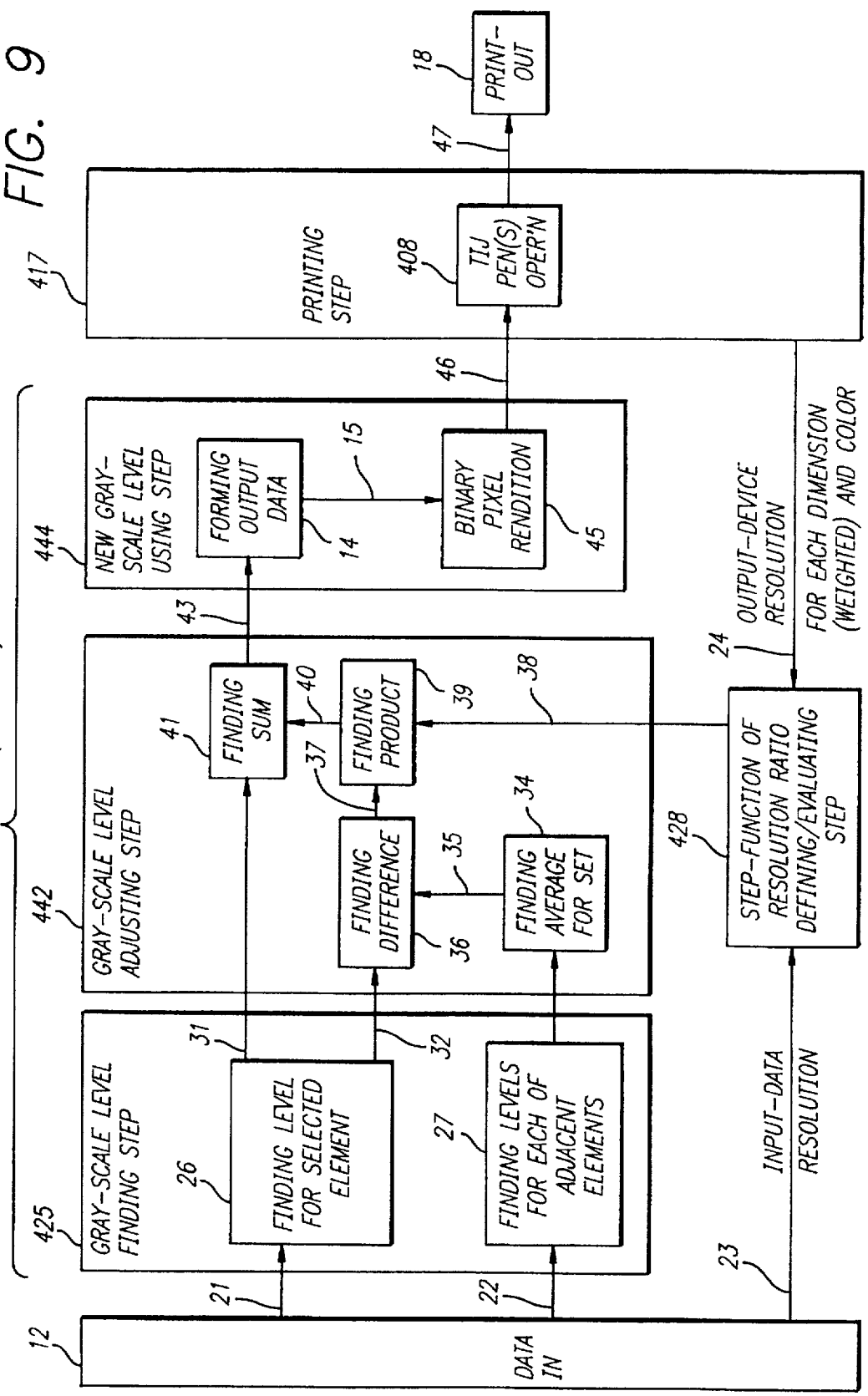
FIG. 9 is a flow diagram corresponding to method of the fourth main aspect or facet of the invention.
Figure 10:
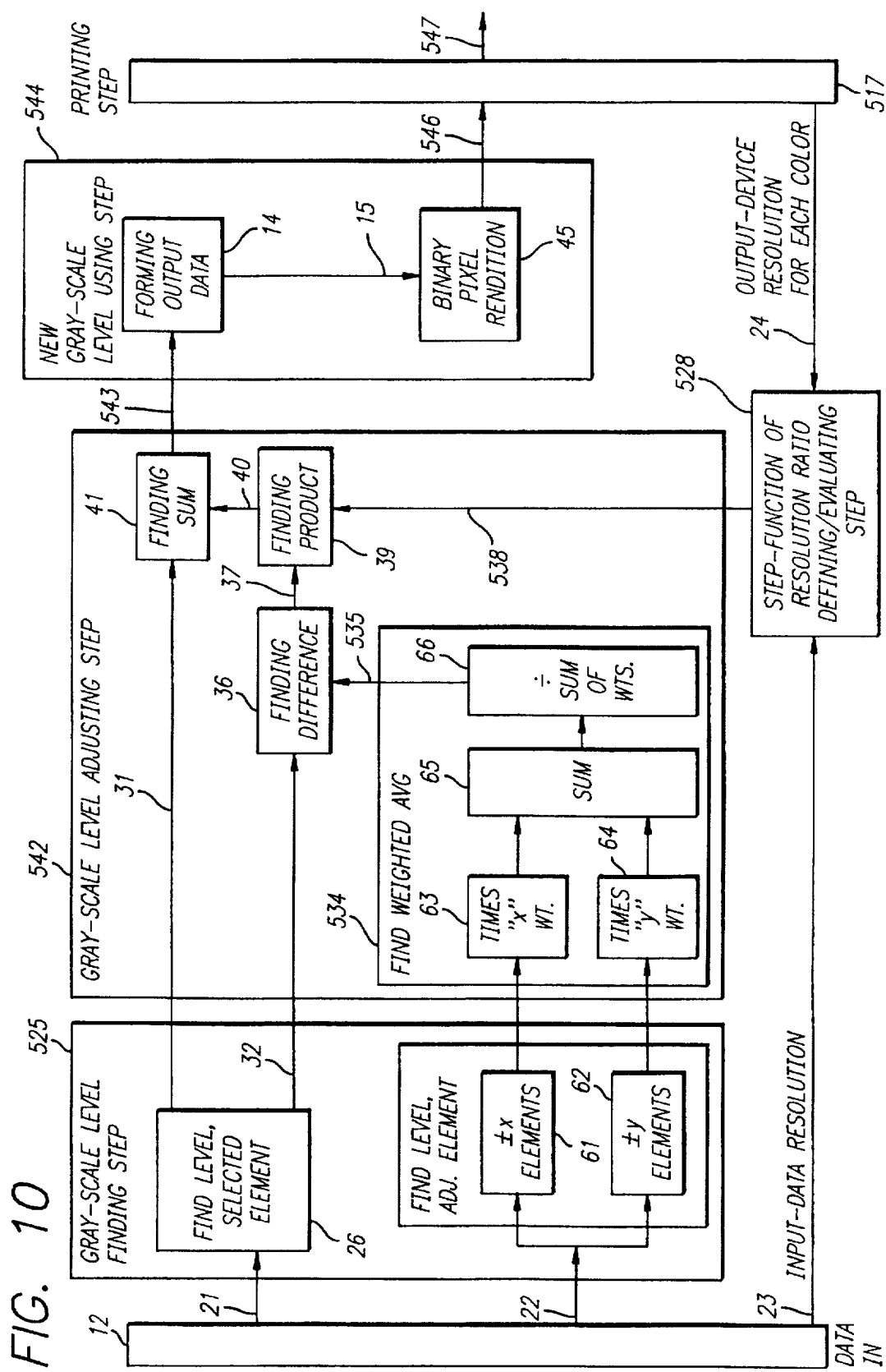
FIG. 10 is a like diagram showing one exemplary embodiment of the FIG. 9 method.

FIG. 9 illustrates a preferred method embodiment of the fourth aspect of the invention, performed generally in accordance with operation of the FIG. 6 apparatus. FIGS. 10 and 11 illustrate two alternative preferred embodiments of the FIG. 9 method.

In both these alternatives, the adjacent-neighbor gray-scale levels are conceptualized as first grouped and read, in a substep 527, by subsets—the elements along the x (carriage scan) axis being defined in one group 61, and those along the y (print-medium advance) axis in another group 62. Then these two data subsets proceed separately into the adjusting step 542.

Now in FIG. 10 the adjusting step has a weighted-averaging substep 534, which in turn consists of several arithmetic operations. Each subset is weighted 63, 64 by a respective weighting factor—that is to say, a factor that is different for the +x vs. the +y subsets. The weighted values are added 65 together, and then divided 66 by the sum of the weighting factors to yield the weighted average 535.

This weighted average is then used in the same way as the unweighted average in systems introduced earlier: its difference relative to the selected-element level 32 is found 36 and passed on to a multiplication substep 39. This substep forms a product 40 of the difference 37 and the sharpening parameter 538.

Preferably the substeps 527, 534, 36, 39, 41 in the neighbor-element data path are all inhibited in a step-function mode, as in the apparatus of FIG. 8. In any event the product 40 is then added 41 to the selected-element level 31, to provide an adjusted level 543 which is used as before.

As will now be clear, the FIG. 10 system produces a sharpened level 543 that is controlled by the departure of the selected-element level V(x,y) from a specialized form of average of the adjacent-neighbor levels—in which some adjacent neighbors are treated as more important than others. This may be one appropriate methodology where, for example, the output device is known to have different resolutions in two directions, as in the case of the previously introduced data plane K (FIG. 5) for printing black.

FIG. 11 shows an alternative approach, also illustrated using the "toggle switch" convention employed earlier. Either the +x elements or the +y elements 61, 62—but not both—are found and read, and fed to the adjusting step. Here an average 71 or 72 is formed as before, but only for the received +x or +y elements.

The resulting average 71 or 72 is selected 77 and passed 75 to a differencing substep 36. The rest of the process is exactly the same as that which follows the more-complete four-element average of FIG. 9—but takes into account only the neighbors along one axis x or v (carriage scan or medium advance respectively).

This approach follows from a similar rationale to that of FIG. 10, and may be regarded as a special (or extreme) case of that system. In this FIG. 11 case, one of the two weights is reduced to zero—with the advantage that the associated now-unnecessary processing can be "turned off" as in FIG. 8.

The above disclosure is intended as merely exemplary, and not to limit the scope of the invention—which is to be determined by reference to the appended claims.

What is claimed is:

1. Apparatus for printing an image on a print medium as marks formed in an array having output-device resolution, based upon input image data defining a pixel array having input-data resolution; said apparatus comprising:

means for finding at least one equivalent gray-scale level for a selected element of the input data, and for each of a plurality of elements of the input data that are near the selected element, respectively;

means for automatically adjusting the equivalent gray-scale level for the selected element, at said input-data resolution, to derive a new equivalent gray-scale level, still at said input-data resolution: wherein said new gray-scale level depends upon:
    a function of both the output-device resolution and the input-data resolution, and
    the found equivalent gray-scale levels for the selected element and each of said plurality of near elements; and
means for using said new equivalent gray-scale level, before halftoning, to form corresponding output data having said output-device resolution.

2. The apparatus of claim 1, in further combination with:
an output device for printing the selected element on such print medium using said output data.

3. The combination of claim 2, wherein:
the output device comprises a thermal-inkjet pen; and
the finding, adjusting and using means comprise at least one digital microprocessor programmed to perform said finding, adjusting and using.

4. The apparatus of claim 1, further comprising:
means for defining and evaluating said function of both the output-device resolution and input-data resolution for the selected element.

5. The apparatus of claim 4, wherein:
said function is a function of the ratio of the input-data resolution to the output-device resolution for the selected element.

6. Apparatus for printing an image on a print medium as marks formed in an array having output-device resolution, based upon input image data defining a pixel array having input-data resolution; said apparatus comprising:
    means for finding at least one equivalent gray-scale level for a selected element of the input data, and for each of a plurality of elements of the input data that are near the selected element, respectively;
    means for automatically adjusting the equivalent gray-scale level for the selected element to derive a new equivalent gray-scale level which depends upon:
        a function of both the output-device resolution and the input-data resolution, and
        the found equivalent gray-scale levels for the selected element and each of said plurality of near elements;
    means for using said new equivalent gray-scale level to form corresponding output data having said output-device resolution; and
    means for defining and evaluating said function of both the output-device resolution and input-data resolution for the selected element; and wherein:
    said function is a function of the ratio of the input-data resolution to the output-device resolution for the selected element; and
    said function is a step-function of the said ratio.

7. The apparatus of claim 6, wherein:
said function is on the order of two for certain values of said ratio, and is on the order of zero for other values of said ratio.

8. The apparatus of claim 6, wherein:
said function takes one value if said ratio does not exceed approximately one-half; and otherwise takes another value.

9. Apparatus for printing an image on a print medium as marks formed in an array having output-device resolution, based upon input image data defining a pixel array having input-data resolution; said apparatus comprising:
    means for finding at least one equivalent gray-scale level for a selected element of the input data, and for each of a plurality of elements of the input data that are near the selected element, respectively;
    means for automatically adjusting the equivalent gray-scale level for the selected element to derive a new equivalent gray-scale level which depends upon:
        a function of both the output-device resolution and the input-data resolution, and
        the found equivalent gray-scale levels for the selected element and each of said plurality of near elements; and
    means for using said new equivalent gray-scale level to form corresponding output data having said output-device resolution; and wherein:
    the adjusting means comprise means for adjusting the equivalent gray-scale level for the selected element to a new equivalent gray-scale level which is substantially equal to:
        the found equivalent gray-scale level for the selected element, plus
        the product of (a) the said function and (b) a function of the found equivalent gray-scale levels for the selected element and each of said plurality of near elements.

10. Apparatus for printing an image on a print medium as marks formed in an array having output-device resolution, based upon input image data defining a pixel array having input-data resolution: said apparatus comprising:
    means for finding at least one equivalent gray-scale level for a selected element of the input data, and for each of a plurality of elements of the input data that are near the selected element, respectively;
    means for automatically adjusting the equivalent gray-scale level for the selected element to derive a new equivalent gray-scale level which depends upon:
        a function of both the output-device resolution and the input-data resolution, and
        the found equivalent gray-scale levels for the selected element and each of said plurality of near elements; and
    means for using said new equivalent gray-scale level to form corresponding output data having said output-device resolution; and wherein:
    the adjusting means comprise means for adjusting the equivalent gray-scale level for the selected element to a new equivalent gray-scale level which is substantially equal to:
        the found equivalent gray-scale level for the selected element, plus
        the product of (a) said function and (b) the difference between:
            the found equivalent gray-scale level for the selected element and
            an average of the found equivalent gray-scale levels for each of said plurality of near elements.

11. The apparatus of claim 1, for preparing such an image that is a color image to print on an output device that comprises means for selectively printing any of a plurality of colorants to mark the selected element on such print medium in color; and wherein:
    the finding means comprise means for finding an equivalent gray-scale level with respect to each colorant of the plurality, for the selected element and for each of the plurality of near elements; and
    the adjusting means comprise means for adjusting the equivalent gray-scale level for each colorant of the plurality, to derive a new equivalent gray-scale level which depends upon:
- a function of both the output-device resolution and the input-data resolution for that colorant respectively, and
- the found equivalent gray-scale levels with respect to that colorant, for the selected element and each of said plurality of near elements.

12. The apparatus of claim 1, further comprising:
means for rendition of the new equivalent gray-scale level in a binary pixel array.

13. The apparatus of claim 1, wherein the finding means comprise:
means for finding an effective gray-scale level for each of a plurality of elements that are substantially adjacent to the selected element.

14. The apparatus of claim 1, wherein:
the adjusting means comprise means for adjusting the equivalent gray-scale level for the selected element to derive a new equivalent gray-scale level that depends on said function and said equivalent gray-scale levels substantially exclusively.

15. Apparatus for preparing an image to print on a print medium as marks formed in an array having output-device resolution, based upon input image data defining a pixel array having input-data resolution; said apparatus comprising:
- means for using said input data to form corresponding output data having said output-device resolution;
- means, operating entirely at said output-device resolution, for finding at least one equivalent gray-scale level for a selected element of the output data, and for each of a plurality of elements of the output data that are near the selected element;
- means, also operating entirely at said output-device resolution but in advance of halftoning, for automatically adjusting the equivalent gray-scale level for the selected element to a new equivalent gray-scale level which depends upon:
  - a function of both the output-device resolution and the input-data resolution, and
  - the found equivalent gray-scale levels for the selected element and each of said plurality of near elements.

16. Apparatus for preparing to print an image on a print medium as marks formed in an array having output-device resolution, based upon input image data defining a pixel array having input-data resolution; said apparatus comprising:
- means for enhancing contrast within the image before error diffusion or other halftoning; and
- means for automatically turning the enhancing means on or off selectively, depending on a relationship between the output-device resolution and the input-data resolution.

17. A method of printing an image on a print medium as marks formed in an array having output-device resolution, based upon input image data defining a pixel array having input-data resolution; said method comprising the steps of:
- finding at least one equivalent gray-scale level for a selected element of the input data, and for each of a plurality of elements of the input data that are near the selected element, respectively;
- automatically adjusting the equivalent gray-scale level for the selected element, at said input-data resolution, to derive a new equivalent gray-scale level, still at said input-data resolution; wherein said new gray-scale level depends upon:
  - a function of both the output-device resolution and the input-data resolution, and
  - the found equivalent gray-scale levels for the selected element and each of said plurality of near elements;
- using said new equivalent gray-scale level to form corresponding output data having said output-device resolution; and
- printing the selected element on such print medium using said output data.

18. The method of claim 17, for use in printing said image in color, using an output device that has different resolutions for different colors; and wherein:
said function is a function of all the resolutions for the colors which the output device can print.

19. The method of claim 18, wherein:
said function used with respect to each color is a function of the output-device resolution for that color and the input-data resolution for that color.

20. The method of claim 17, for use in printing said image using an output device that has different resolutions along different dimensions of said mark-formed array and different dimensions of said input-data pixel array; and wherein:
said function is a function of all the resolutions for said different dimensions.

21. The method of claim 20, wherein:
said function comprises weighted functions used with respect to each common dimension, respectively, of said input-data pixel array and said mark-formed array.

22. The method of claim 20, wherein:
said finding step comprises finding said at least one equivalent gray-scale level for each of a plurality of elements of the input data that are near the selected element along, exclusively, a particular common dimension of said input-data pixel array and said mark-formed array; and
in said adjusting step, said new equivalent gray-scale level depends upon said function and the found levels for the selected element and, exclusively, said elements along said particular commom dimension.

* * * * *